United States Patent [19]
Laird

[11] 4,123,148
[45] Oct. 31, 1978

[54] REFLECTIVE LASER LINE GENERATOR

[75] Inventor: Dale E. Laird, Vancouver, Wash.

[73] Assignee: Industrial Electrical Control Corporation, Vancouver, Wash.

[21] Appl. No.: 787,148

[22] Filed: Apr. 13, 1977

[51] Int. Cl.$^2$ .......................... G02B 5/10; G01B 11/00
[52] U.S. Cl. ..................................... 350/293; 356/138
[58] Field of Search ............... 350/293, 288, 296, 299; 356/138, 152, 172, 247, 248, 76

[56] References Cited
U.S. PATENT DOCUMENTS

| | | | |
|---|---|---|---|
| 3,554,647 | 1/1971 | Goodwin et al. | 356/76 |
| 3,820,903 | 6/1974 | Kindl et al. | 356/138 |

*Primary Examiner*—Jon W. Henry
*Attorney, Agent, or Firm*—Chernoff & Vilhauer

[57] ABSTRACT

Apparatus for reflectively generating a straight line light path from a laser beam comprises a planar reflective surface which is arranged to reflect the laser output beam approximately 90°, and an arcuate reflective surface, such as a hollow cylinder, which is located relative to the planar reflective surface such that the reflected beam is impinged thereon normal to its axis of curvature. The cylinder is arranged with its axis of curvature parallel to and offset from the laser output beam so that every increment of the columnar reflected beam strikes it at a point having a tangent which is at a different angle with respect to the reflected beam than every other increment of the beam. Accordingly, each increment of the beam is reflected from the arcuate reflective surface at a different angle, thereby creating a fan shaped pattern of light. The planar mirror is angularly adjustable, for directing the reflected beam onto the arcuate reflective surface along a single circumferential line for making the resulting fan shaped beam straight and perpendicular to the axis of curvature of the cylinder. Also, both the amount of offset and the angle of the axis of curvature of the cylinder are adjustable for adjusting respectively the included angle of the fan and its straightness and perpendicularity.

5 Claims, 5 Drawing Figures

U.S. Patent  Oct. 31, 1978  Sheet 1 of 2  4,123,148
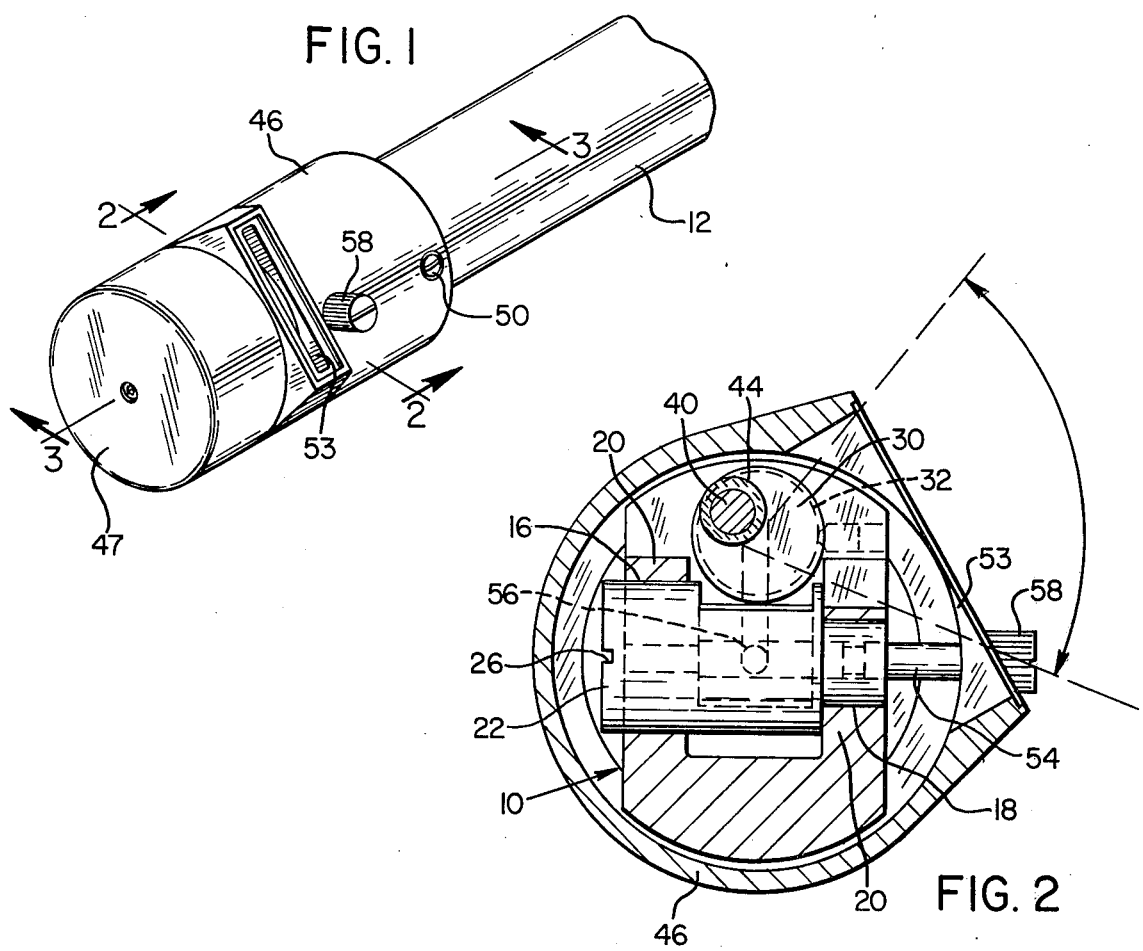
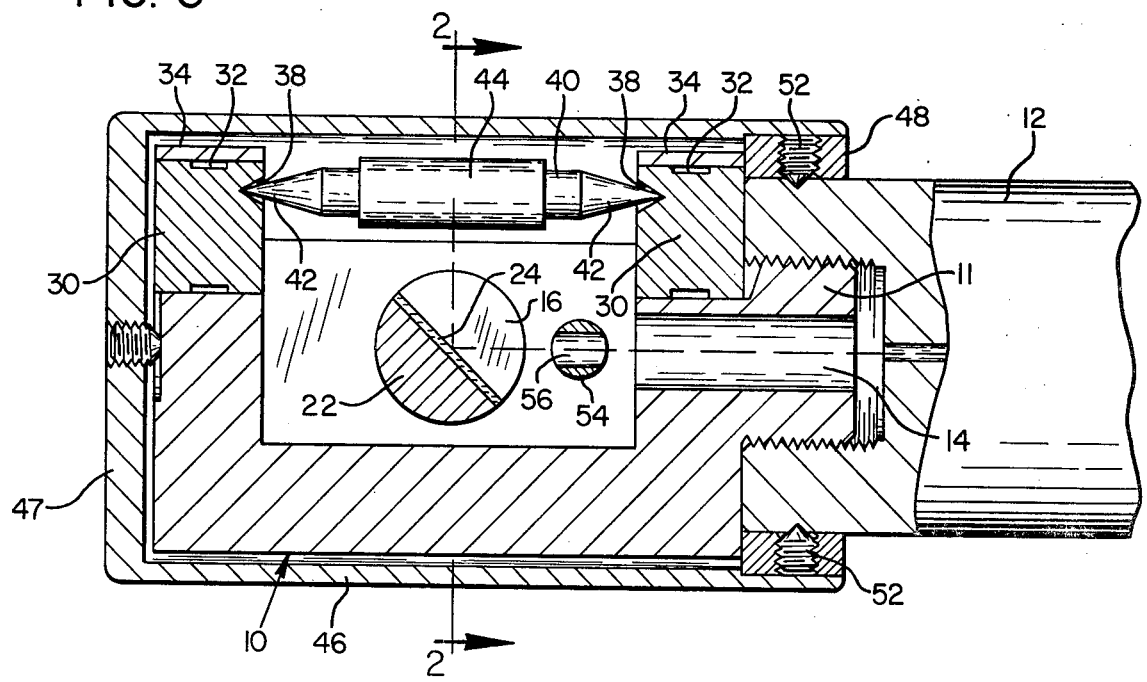

REFLECTIVE LASER LINE GENERATOR

BACKGROUND OF THE INVENTION

This invention relates to an apparatus for generating a straight line from a laser beam and in particular to such an apparatus which generates a line entirely by reflectance of the laser beam.

In many applications there is a need to produce a thin reference line on a remote object which is nearly straight over its entire length and which is accurately aligned. In addition, often the line must be projected non-evasively. Accordingly, lines of this type commonly are projected as a thin beam of light and a laser, due to the highly columnated beam it emits, is widely used as the light source.

A laser line generator of the prior art is disclosed for example in Chin et al., U.S. Pat. No. 3,984,154, wherein the laser output beam is impinged upon an annular cylinder having concentric surfaces, the outer one being semi-reflective and the inner one being fully reflective. The light is repeatedly bounced between the reflective surfaces with a progressively lesser portion being reflected away from the cylinder on each successive reflection. This device utilizes the multiple reflections between the reflective surfaces along with the refractive characteristics of the cylinder, through which each increment of the projected light passes at least twice, to form the fan shape desired. Accordingly, there are multiple reflections off of the reflective surfaces and multiple transmissions through the cylinder material, each of which results in a loss, thus causing an overall lower inntensity of the final projected beam. Also, in order to average the intensity of the light over the angular extent of the beam, the semi-reflective surface must vary in reflectivity progressively around the cylinder, making devices of this type expensive to initially fabricate. In addition, prior art devices of this class do not disclose means to adjust the projected line for straightness and perpendicularity with respect to the laser beam, and by their very nature did not allow adjustment of the included angle of the fan.

Another type of generator wherein a columnated light source is reflected off of an arcuate surface to generate a fan shaped projection is shown in Kindl et al., U.S. Pat. No. 3,820,903, and Hanson, U.S. Pat No. 3,887,282 wherein the beam is reflected off of conic surfaces. Since they place the axis of the reflective surface which forms the fan shaped beam co-axial with the axis of the beam of light which is reflected off of it, rather than orienting the axis of the reflective surface normal to the beam as in the present invention, they utilize different principles of reflectance than the principal invention to obtain similar results. Again the line generators of this class do not provide means to adjust the included fan angle, straightness and perpendicularity of the generated beam.

SUMMARY OF THE INVENTION

The present invention basically comprises an apparatus for projecting a thin, straight line from a columnated laser beam by reflecting the beam first off of a planar reflective surface and then off of an arcuate reflective surface, normal to its axis of curvature, so that the resulting beam is oriented perpendicular to the axis of the laser. The planar reflective surface is adjustable angularly in order to direct the beam reflected by it onto a single circumferential line on the arcuate reflective surface for insuring that the projected fan shaped beam is straight, properly aligned and perpendicular to the laser.

The arcuate surface in the embodiment illustrated is in the form of a hollow cylinder which is carried by a mandril having pointed extremities arranged for mounting the cylinder eccentrically between paired cams. The cams are mounted rotatably about an axis which is co-axial with the laser beam, thereby allowing the axis of the cylinder to be offset from the reflected beam so that the reflected beam strikes the arcuate reflective surface off center. Accordingly, every increment of the beam strikes the surface at a point having a different tangential angle than every other increment, causing each increment to be reflected at a different angle thereby forming the fan shape.

The included angle of the fan is adjustable by simultaneous rotation of the cams, thereby presenting another portion of the arcuate reflective surface to the beam which is reflected from the planar reflective surface, and the straightness and perpendicularity of the projected line is adjusted by selective rotation of the respective cams relative to one another.

The reflective surfaces are mounted in a frame which is releasably mounted to a laser. The frame in turn is enclosed by a case, which also is releasably mounted to the laser, to contain stray light. A window is located in one side of the case to pass the fan shaped beam out of it.

It is a principal object of the present invention to provide such an apparatus which uses simple elements to reflect the laser output beam only twice in generating a line.

It is a further object of the principal invention to provide such an apparatus which has means for adjusting the projected line for both straightness and perpendicularity.

It is further object of the principal invention to provide such an apparatus which is inexpensive to fabricate and which is durable in operation.

The foregoing objects, features and advantages of the principal invention will be more readily understood upon consideration of the following detailed description of the invention taken in conjunction with the accompanying drawings.

BRIEF DESCRIPTION OF THE DRAWINGS

FIG. 1 is a pictorial view showing a preferred embodiment of the laser line generator of the present invention.

FIG. 2 is a sectional view taken on the line 2—2 of FIG. 1.

FIG. 3 is a sectional view taken on the line 3—3 of FIG. 1.

DETAILED DESCRIPTION OF THE PREFERRED EMBODIMENT

Figure 4:
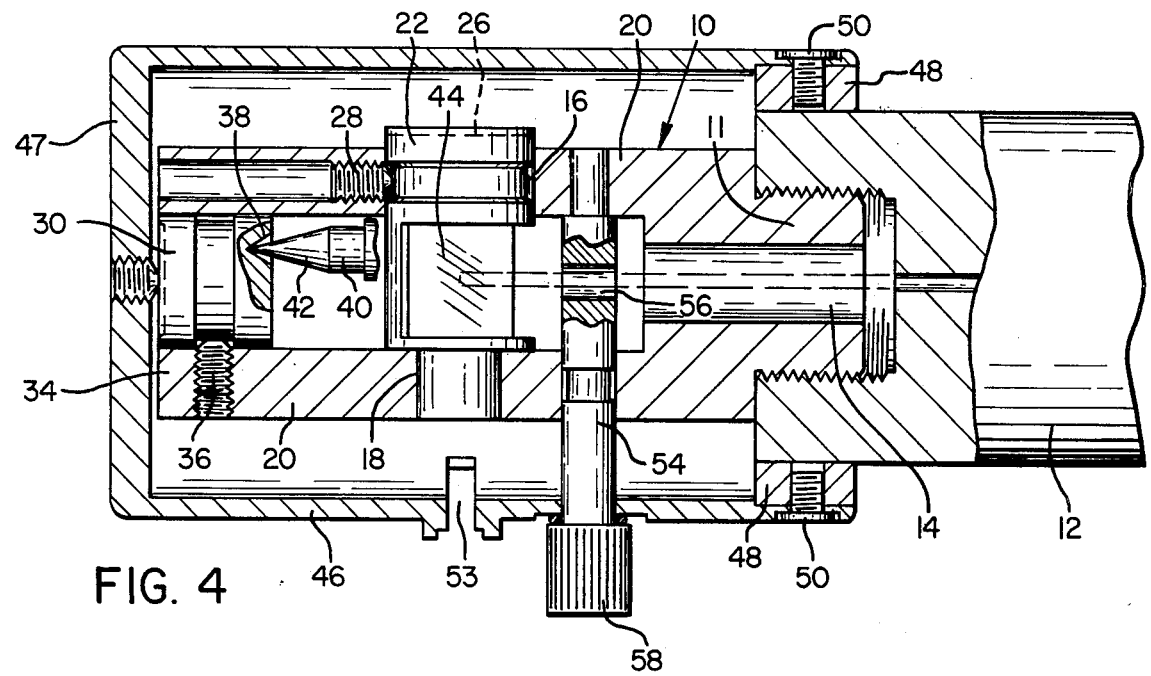
FIG. 4 is a plan view of the laser line generator, partially in section and partially broken away.

Referring to FIGS. 2, 3 and 4 of the drawings, the operative elements of the instant invention are mounted on a U-shaped frame 10 having a threaded boss 11 located at one end which is configured for engagement with the threaded opening of a laser 12. A cylindrical bore 14 extends through the boss into the U-shaped opening of the frame thereby defining a central light path through the frame which is aligned with the laser output beam.

Located across the light path rotatably in concentric bores 16 and 18, which pass through the respective sides 20 of the frame, is a cylindrical mirror holder 22 having a planar reflective surface 24 formed therein. The reflective surface is located diametrically in the mirror holder so that when it is oriented diagonally to the output beam, as shown in the drawings, the beam is reflected approximately 90°. The mirror holder is freely rotatable in frame 10 and a screwdriver slot 26 is provided in one of its ends to facilitate its rotation by the user. A set screw 28 communicates in a threaded bore which is located in the frame in a manner such that the screw can be tightened against the side of the mirror holder to lock it in any desired orientation. The planar reflective surface allows orienting the laser beam such that the apparatus can be made in a more compact unit, however, as will be more fully explained later the device alternately can be configured to operate without this element.

Cylindrical cams 30 are rotatably located in bores 32 passing through each end 34 of frame 10. The common center line of the cams is aligned parallel with and a spaced distance above the center line of the light path, along which the laser output beam passes. Each cam is freely rotatable in its bore and is lockable in any desired position by an associated set screw 36. Located off center in the inwardly facing surface of the cams are conic depression 38 which mount the opposed conic extremities 42 of a cylindrical mandril 40. Extremities 42 have included angles which are less than the angle of the depressions in order that they fit loosely therein allowing the cams to be rotated relative to one another so that the mandril is skewed.

Circumscribing the mandril and carried thereby is a hollow, glass cylinder 44 which is silvered on its outer surface to give an arcuate reflective surface. Thus when the cams are rotated so that the central axis of the cylinder is parallel with the centerline of the light path and is offset transversely therefrom, the output beam from the laser, reflected 90° by the planar reflective surface 24, strikes a circumferential off center portion of the arcuate reflective surface normal to its axis of curvature where it is reflected into a fan shaped light beam as shown in FIG. 2. As will be more fully explained later the width of the fan pattern and its orientation can be adjusted by selectively positioning the respective cams.

The operative elements of the apparatus are covered by a tubular case 46, FIG. 1, having one closed end 47, which is mounted to an annular attachment ring 48 at its open end by means of plurality of radially spaced bolts 50. Ring 48 is in turn mounted to the end of the laser by means of set screws 52 so that the case does not contact frame 10 and is supported entirely by the laser. A thin elongate window 53 is located transversely in one side of the case perpendicular to the axis of cylinder 44 for passage of the fan shaped beam out of the case.

Rotatably mounted in frame 10 across the light path is a rod 54 having a medial opening 56 arranged to pass the output of the laser when the opening is rotationally aligned with the light path, and interrupt the output beam when it is rotated 90° from that position. The rod passes out of an opening in the case and has a knob 58 located at its extremity to facilitate its rotation.

Figure 5:
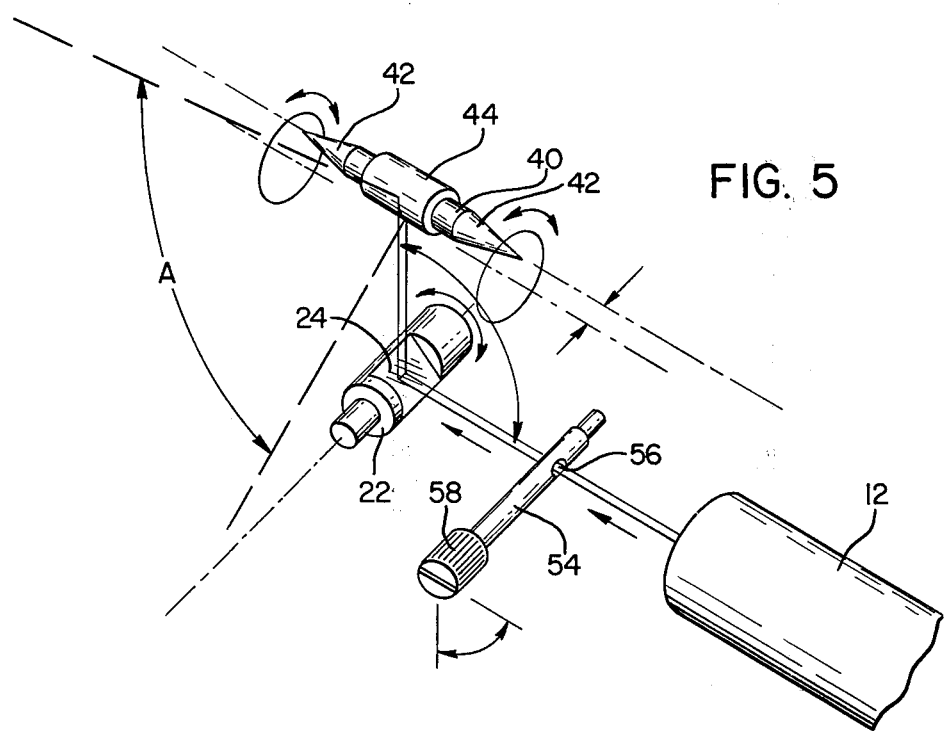
FIG. 5 is a diagrammatic view, showing the various operational elements of the laser line generator and their orientation to one another.

In operation, frame 10 is attached to laser 12 and is covered by case 46. Referring to FIG. 5, the output beam of the laser passes through opening 56 in rod 54 and strikes planar reflective surface 24 of mirror holder 22, where it is reflected approximately 90° onto the side of the arcuate reflective surface of cylinder 44 normal to its axis of curvature. Since every transverse increment of the reflected beam strikes the arcuate reflective surface at a point whose tangency is at a different angle with respect to the beam, each increment accordingly is reflected at a different angle with respect to the beam than every other increment, forming a fan shaped pattern having an included angle A. The fan shape then is transmitted out of window 53 to be projected onto an external object forming a line. It will be noted that the further cylinder 44 is off center of the beam the greater the included angle A of the fan, allowing fan angle to be adjusted by simultaneous rotation of both cams 30.

By rotating mirror holder 22, the beam reflected from planar reflective surface 24 can be caused to strike the arcuate reflective surface along a single circumferential line, causing the fan to project as a straight line which is perpendicular to the laser output beam. Also, the same effect can be achieved by adjusting the skew of the cylinder by selective rotation of the respective cams 30 with respect to each other. Accordingly, straightness and perpendicularity of the fan shaped beam can be adjusted as desired.

As noted, alternately the frame can be arranged to direct the laser output beam directly on the arcuate reflective surface in the manner aforesaid without first reflecting it off of the planar reflective surface. In this event all adjustment to the fan shape beam is accomplished by rotation of cams 30.

If interruption of the beam is required, the rod 54 is turned by knob 58 to rotate opening 56 out of alignment with the laser output beam.

The terms and expressions which have been employed in the foregoing abstract and specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. Apparatus for generating a straight line light beam comprising:
   a. a laser emitting a collimated output beam along a predetermined light path;
   b. a frame having means for mounting said laser and having an opening defined therein in a maner for passing said output beam;
   c. a planar reflective surface mounted in said frame, intersecting said light beam in a manner to reflect said output beam into a reflected beam which is oriented approximately 90° with respect to said output beam;
   d. a cylindrical reflective surface means, having a longitudinal axis which generally is perpendicular to said reflected beam and offset laterally therefrom, located so that said reflected beam strikes said cylindrical reflective surface means transversely off center and substantially normal to its longitudinal axis, for further reflecting said reflective beam into a thin, fan-shaped light beam;
   e. wherein said planar reflective surface means is rotatable about an axis which is coextensive with its reflective surface, and perpendicular to said output beam, for adjusting the longitudinal location at which the reflected output beam intersects the cylindrical reflective surface means, thereby adjusting the straightness and perpendicularity of said fan-shaped light beam.

2. The apparatus of claim 1 including means for varying the offset of said longitudinal axis with respect to the reflected beam for altering the range of incident angles said cylindrical reflective surface means presents to said reflected beam for adjusting the included angle of said fan-shaped light beam.

3. The apparatus of claim 1 wherein the cylindrical reflective surface means comprises an elongate cylinder, paired cam members mounted in said frame rotatably about an axis which is parallel with and offset from the center line of said cylinder, and means joining each end of said cylinder to one of said cam members such that either of said cam members can be rotated independently of the other of said cam members thereby skewing said cylinder.

4. The apparatus of claim 3 including means of releasably locking each of said cam members to said frame in any desired rotational orientation.

5. The apparatus of claim 3 wherein the cylindrical reflective surface means includes an exteriorily silvered hollow glass cylinder and said means for joining the ends of said cylinder to the cam members comprises, a cylindrical mandril adopted to fit snugly within said hollow glass cylinder, said mandril having pointed conic extremities arranged to protrude beyond said hollow glass cylinder, and said cam members each having a conic depression on its inwardly facing surface arranged for receiving one of said pointed conic extremities.

* * * * *